Nov. 8, 1949   J. WYMAN ET AL   2,487,748
AIR THERMOGRAPH
Filed Sept. 13, 1946   2 Sheets-Sheet 2
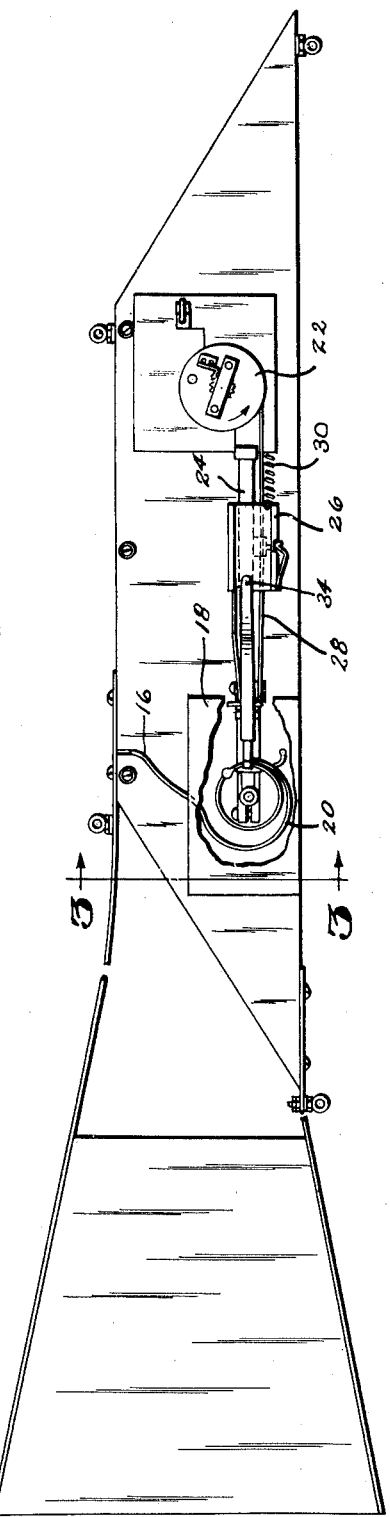
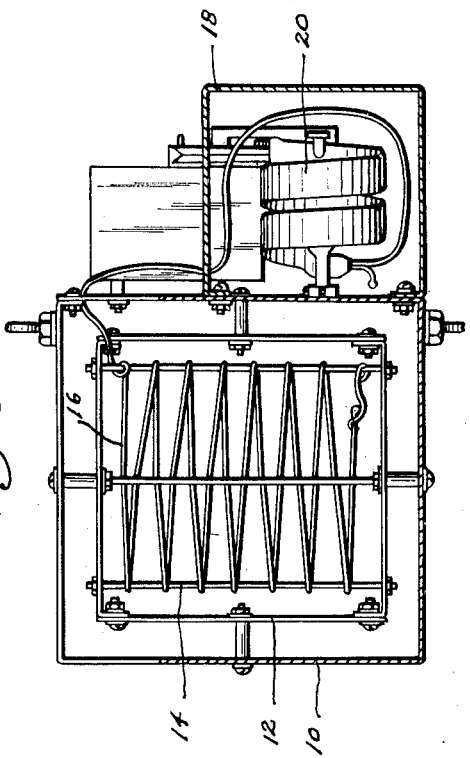
Inventors
Jeffries Wyman
David F. Barnes
Attorney Patented Nov. 8, 1949

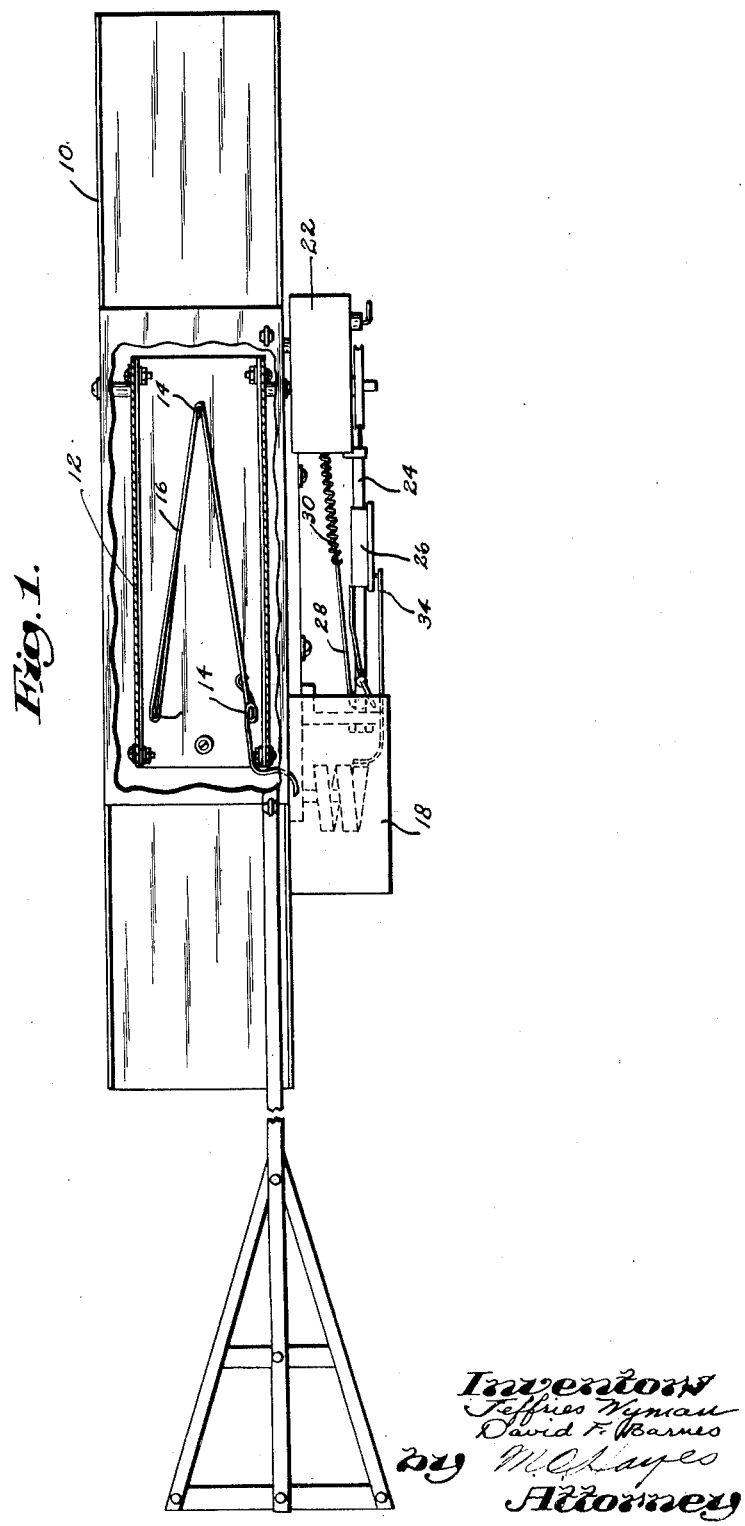

2,487,748

UNITED STATES PATENT OFFICE 2,487,748

AIR THERMOGRAPH

Jeffries Wyman and David F. Barnes, Woods Hole, Mass., assignors to the United States of America as represented by the Secretary of the Navy Application September 13, 1946, Serial No. 696,928

4 Claims. (Cl. 73—369)

This invention relates to a device for observing temperature, and more particularly to a thermograph for measuring and recording the temperature of the lower atmosphere.

It has been determined that the temperature versus height characteristic of the lower atmosphere has considerable bearing on the way in which smoke behaves. For example, if the temperature increases with height, or if the temperature decreases but the rate of decrease is less than one degree Fahrenheit per hundred and eighty feet, the air is relatively stable and smoke will remain low. Thus, data on temperature gradient are necessary in connection with the use of smoke screens for military or other purposes.

It is, therefore, the object of the present invention to provide improved apparatus for measuring and recording temperature in the lower atmosphere.

Another object is to provide a thermograph which is sufficiently sensitive and accurate to detect and record small changes in temperature.

These and other objects will be more apparent upon consideration of the following specification, taken in connection with the accompanying drawings, in which:

Fig. 1 is a plan view and partial cross section of the thermograph;

Fig. 2 is a side elevational view; and

Fig. 3 is a cross section taken on the line 3—3 of Fig. 2.

Referring to the drawings, 10 denotes a casing, preferably formed of a light metal such as aluminum. In the present embodiment the casing is substantially rectangular in cross section, the whole structure being tapered at the ends as shown in Fig. 2. A second casing 12 of smaller size is supported by studs in a fixed space relationship to outer casing 10. Mounted within the inner casing are posts 14, arranged in the present case to form a triangular support. Arranged about posts 14 is a substantial length of very small copper tubing 16. One end of tubing 16 is sealed and the other end passed around the inner casing 12 and through the wall of the outer casing 10 into a box 18, which box is firmly fastened to the outer casing. Within box 18 is mounted a Bourdon tube 20 to which tubing 16 is connected.

One important feature of the invention is the combination of the tubing 16 and Bourdon tube 20. The present embodiment employs approximately fifteen feet of tubing 16 having an inside diameter of .022 of an inch and an outside diameter of .042 of an inch. This tubing is filled with propane, the high coefficient of thermal expansion of which tends to reduce the length of tubing required. Tubing with a thin wall is chosen so as to make the heat capacity very small. Accordingly, when exposed to air currents the speed of response to temperature change is relatively high, the structure described being capable of providing a ninety percent response in thirteen seconds in a seven knot wind. The Bourdon tube itself has a slow response. It is filled with a mixture of ethylene glycol and water, which mixture has a very low coefficient of thermal expansion. The fluids filling the tubing 16 and the Bourdon tube 20 are chosen to be immiscible.

Mounted on the same side of casing 10 as is box 18, and in spaced relation to the Bourdon tube is a clockwork escapement mechanism 22. Mounted between the mechanism 22 and box 18 is a bar 24 which is preferably formed of some light material such as aluminum. Carriage 26 is so constructed that it rides along bar 24 in linear movement in response to the action of the mechanism 22. Cord 28 and spring 30 connect the escapement mechanism and carriage 26 so that carriage 26 is moved along a linear path. The time required for the carriage to move a distance equal to its own length may be varied, one suitable period having been found to be eighteen minutes.

Carriage 26 is so constructed that a chart may be attached thereto, such as for example, a smoked glass slide. The Bourdon element has clipped to the end not already connected to the tubing 16 a stylus 34 which plots on the slide, as the slide is moved by the escapement mechanism, the response of the Bourdon element. The resulting picture on the slide represents a plot of temperature versus time, and, by proper use of the equipment, time may be made to be representative of height.

The structure as herein described may be so constructed as to be relatively light in weight, twenty-nine ounces being the observed weight of this embodiment. The double walls afforded by casings 10 and 12, in conjunction with the triangular mounting of the tubing, substantially eliminate direct and reflected solar radiation. Sun visors have been provided at either end to further eliminate solar radiation.

In operating the device in winds of a velocity of less than twelve knots, the structure may conveniently be raised by means of a balloon; in higher winds, by a kite. The instrument is allowed to move upward in stages, being maintained for a short interval at each desired height to allow a state of thermal equilibrium to be reached. It has been found that thirty seconds allows for a stable reading. The length of line released, and the angle of the line relative to the ground as measured by a sextant, may be recorded for each step. The height is determined from these two quantities, and the temperature difference between each station and the ground is determined by means of a calibration slide. It has been found that such temperature differences can be determined accurately to one-tenth of a degree Fahrenheit. It is apparent that this instrument provides a light, accurate, sensitive thermograph well adapted to provide the temperature values required for the purposes cited.

While we have disclosed a preferred embodiment of our invention, it will be obvious to one skilled in the art that various changes and modifications may be made without departing from the spirit of the invention, as sought to be defined by the following claims.

What is claimed is:

1. An air thermograph comprising, a Bourdon tube filled with a fluid having a low coefficient of expansion, a length of tubing filled with a fluid having a relatively high coefficient of expansion connected to said Bourdon tube, said fluid having the low coefficient of expansion and said fluid having the high coefficient of expansion being so chosen as to be immiscible, a double walled container having two sides opposite each other open to the atmosphere, triangularly arranged means mounted within said container for supporting said tubing in a coiled position, a clockwork escapement mechanism mounted in spaced relation to said Bourdon tube, a bar mounted between said escapement mechanism and said Bourdon tube, a carriage so constructed that it rides along said bar, said carriage being so connected to said escapement mechanism that it traverses said bar in response to the action of said escapement mechanism, a chart affixed to said carriage, a stylus clipped to one end of said Bourdon element, whereby the response of said Bourdon element is plotted on said chart as it moves along in response to the action of said escapement mechanism.

2. An air thermograph comprising, a first open-ended container, a second open-ended container mounted within said first container in spaced relationship therewith, a Bourdon tube attached to one wall of said first container, said Bourdon tube being filled with a fluid of comparatively low coefficient of expansion, a length of capillary tubing filled with a fluid of comparatively high coefficient of expansion connected to said Bourdon tube, triangularly arranged means mounted within said second container for supporting said tubing in a coiled position, an escapement mechanism mounted on said one wall in spaced relationship with said Bourdon tube, a bar mounted on said one wall between said escapement mechanism and said Bourdon tube, a carriage operably connected to said escapement mechanism and mounted for movement along said bar, a chart affixed to said carriage, a stylus secured to one end of said Bourdon tube for engagement with said chart whereby the response of said Bourdon element is plotted on said chart as it moves along in response to the action of said escapement mechanism.

3. An air thermograph comprising, a double-walled container having two sides opposite each other open to the atmosphere, a Bourdon tube attached to an outer wall of said container, said Bourdon tube being filled with a fluid having a low coefficient of thermal expansion, a length of capillary tubing filled with a fluid having a high coefficient of thermal expansion connected to said Bourdon tube, a triangularly arranged structure mounted within said container for supporting said tubing in a coiled position, a clock-operated mechanism, a chart movable in response to said clock-operated mechanism mounted on said container adjacent said Bourdon tube, and recording means secured to one end of said Bourdon tube for engagement with said chart whereby the response of said Bourdon tube is plotted on said chart as it moves along in response to the action of said clock-operated mechanism.

4. An air thermograph comprising, a double-walled container having two sides opposite each other open to the atmosphere, a Bourdon tube attached to an outer wall of said container, a length of capillary tubing filled with a fluid having a high coefficient of thermal expansion connected to said Bourdon tube, means located within said container for supporting said tubing in a coiled position, means for moving a chart along a linear path adjacent said Bourdon tube and means secured to one end of said Bourdon tube for engagement with said chart whereby the response of said Bourdon tube is plotted on said chart.

JEFFRIES WYMAN.
DAVID F. BARNES.

REFERENCES CITED

The following references are of record in the file of this patent:

UNITED STATES PATENTS

| Number | Name | Date |
| --- | --- | --- |
| 632,942 | Hervais | Sept. 12, 1899 |
| 1,326,957 | Norwood | Jan. 6, 1920 |
| 1,331,553 | Amthor | Feb. 24, 1920 |
| 1,367,520 | Swift | Feb. 1, 1921 |
| 2,331,810 | Sphilhaus | Oct. 12, 1943 |

FOREIGN PATENTS

| Number | Country | Date |
| --- | --- | --- |
| 17,846 | Great Britain | Aug. 1, 1912 |
| 458,926 | Germany | Apr. 23, 1928 |